(12) United States Patent  (10) Patent No.: US 8,209,159 B2
Bensch et al.  (45) Date of Patent: Jun. 26, 2012

(54) METHOD FOR RECONSTRUCTING GUSTS AND STRUCTURAL LOADS AT AIRCRAFT, IN PARTICULAR PASSENGER AIRCRAFT

(75) Inventors: Lars Bensch, Hamburg (DE); Hermann Henrichfreise, Bergisch Gladbach (DE); Juergen Jusseit, Nuembrecht (DE); Ludger Merz, Hamburg (DE)

(73) Assignee: Airbus Operations GmbH (DE)

( * ) Notice: Subject to any disclaimer, the term of this patent is extended or adjusted under 35 U.S.C. 154(b) by 987 days.

(21) Appl. No.: 12/085,891

(22) PCT Filed: Dec. 6, 2006

(86) PCT No.: PCT/EP2006/011717
§ 371 (c)(1),
(2), (4) Date: Jun. 2, 2008

(87) PCT Pub. No.: WO2007/065659
PCT Pub. Date: Jun. 14, 2007

(65) Prior Publication Data
US 2009/0171634 A1 Jul. 2, 2009

(30) Foreign Application Priority Data
Dec. 6, 2005 (DE) .......................... 10 2005 058 081

(51) Int. Cl.
*G06G 7/48* (2006.01)
(52) U.S. Cl. .......................................................... 703/8
(58) Field of Classification Search ................... 703/8
See application file for complete search history.

(56) References Cited

U.S. PATENT DOCUMENTS

| 3,733,424 | A | 5/1973 | Pitts et al. |
| 4,336,595 | A | 6/1982 | Adams et al. |
| 5,072,893 | A | 12/1991 | Chakravarty et al. |
| 5,330,131 | A | 7/1994 | Burcham et al. |
| 5,541,591 | A | 7/1996 | Bush |
| 5,710,559 | A | 1/1998 | Krogmann |
| 6,064,923 | A | 5/2000 | Bilange et al. |
| 6,125,333 | A | 9/2000 | Pun |

(Continued)

FOREIGN PATENT DOCUMENTS

DE 4240600 6/1994

(Continued)

OTHER PUBLICATIONS

Henrichfreise et al.; Estimation of Gusts and Structural Loads for Commercial Aircraft; International Forum on Aeroelasticity and Structural Dynamics (IFASD) 2009, Seattle, USA, Jun. 21-25, 2009; pp. 1-11.*

(Continued)

*Primary Examiner* — Hugh Jones
(74) *Attorney, Agent, or Firm* — Lerner, David, Littenberg, Krumholtz & Mentlik, LLP

(57) ABSTRACT

A method for reconstructing gusts and/or structural loads at aircraft, in particular passenger aircraft. The method includes generating an observer on the basis of a nonlinear model of the aircraft which describes the movement of the aircraft in all six degrees of freedom (DoF) and the elastic motion of the aircraft structure; continuously supplying all the data and measurements substantial for the description of the state of the aircraft to the observer; and calculating the gust velocities and structural loads (maneuver and gust loads) by the observer from the supplied data and measurements.

48 Claims, 13 Drawing Sheets

Observer associated with plant (aircraft)

U.S. PATENT DOCUMENTS

| | | |
|---|---|---|
| 6,473,676 B2 | 10/2002 | Katz et al. |
| 7,043,409 B1 | 5/2006 | Schaffler et al. |

FOREIGN PATENT DOCUMENTS

| | | |
|---|---|---|
| EP | 0407179 | 1/1991 |
| EP | 0675420 | 10/1995 |
| EP | 1018641 | 7/2000 |
| SU | 1399760 A1 | 5/1988 |
| WO | 00/33209 | 6/2000 |

OTHER PUBLICATIONS

Hofstee et al.; A Variable, Fully Flexible Dynamic Response Tool for Special Investigations (VARLOADS); Copyright 2003 © by Airbus Deutschland GmbH. Published by Nederlandse Vereniging voor Luchtvaarttechniek; pp. 1-12.*

Pankevitch A. A. "Diskretnaja model letatelnogo apparata dla sadatch avotmatisirovannogo proektirovanija ego dinamitcheskoj komponovki", Prikladnaja geometrija 6 N 13 (2004) p. 35-43 (English translation of abstract only).

Belousov A. I. "Vlijanie uprugosti konstrukzii letatelnogo apparata na bosproisvedenie peremennich nagrusok pri protchnostnich uspitanijach", Dissertation; Novosibirsk, 2003; S. 147 (English translation of abstract only).

Rynaski E. G., Andrisani D.H., Weingarten N., „Active Control for the Total-In-Flight Simulator (ACTIFS), NASA CR-3118, 1979 (N79-23978), Abstract.

Fairman F. W., "Optimal Observers for a Class of Continuous Linear Time-Varying Stochastic Systems", IEEE Transactions on Automatic Control, Feb. 1977, p. 136/137.

International Search Report, PCT/EP2007/011717.

* cited by examiner

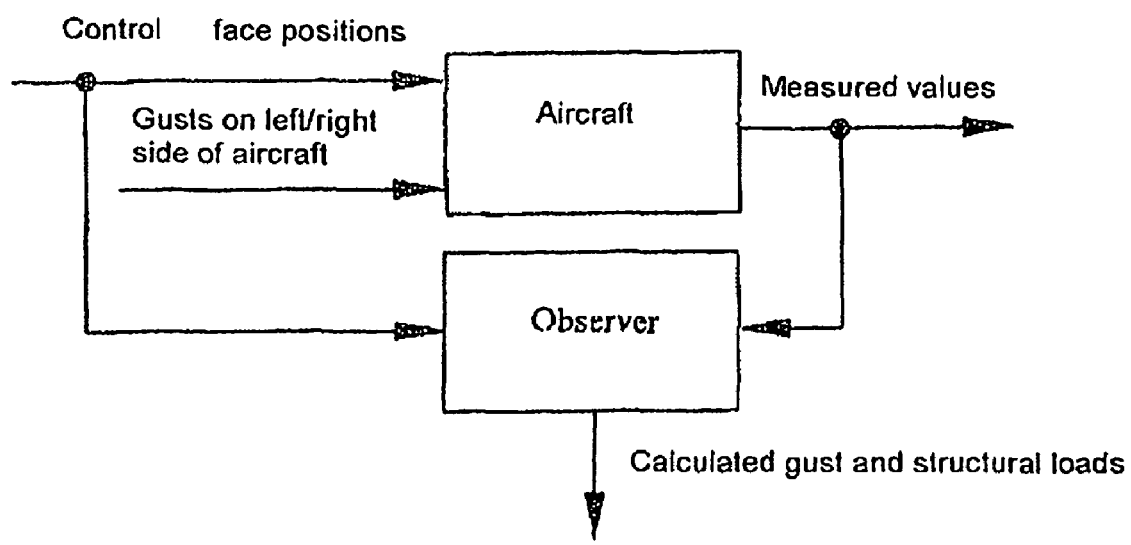
Fig. 1: *Principle of gust and load reconstruction*

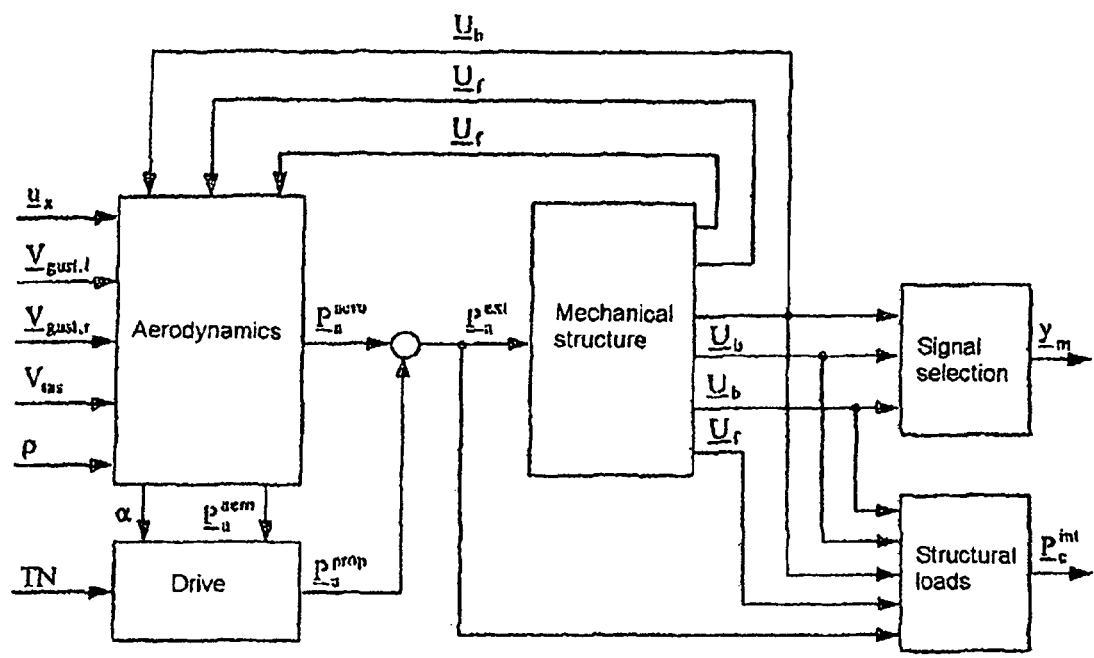
Fig. 2: *Structure of the nonlinear aircraft model*

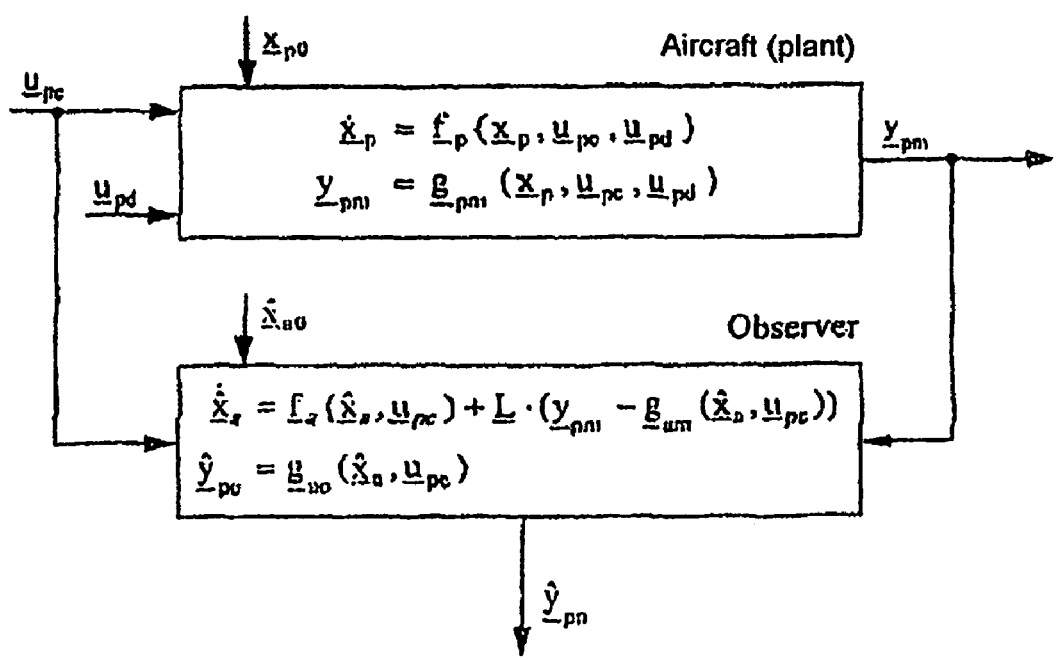
Fig. 3: *Observer associated with plant (aircraft)*

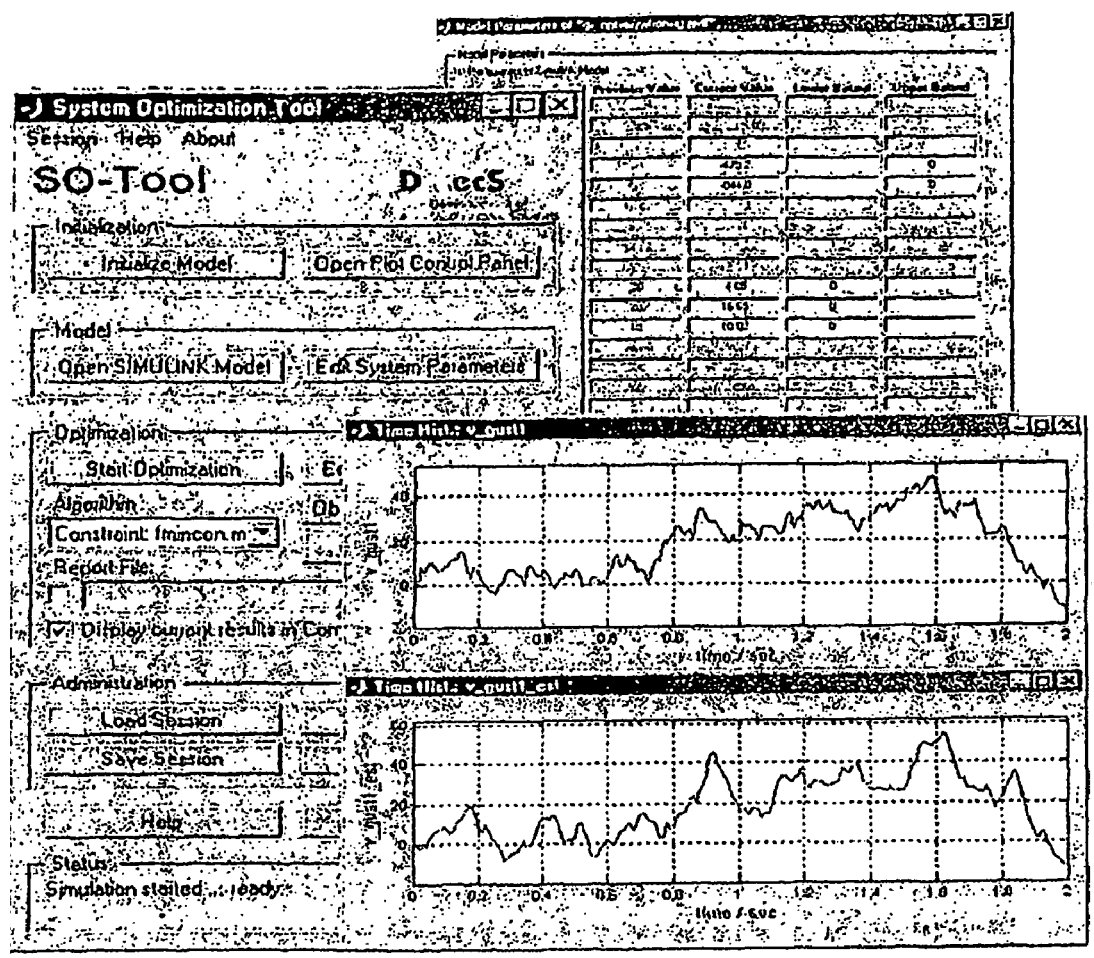
Fig. 4: Graphical user interface of the SO tool

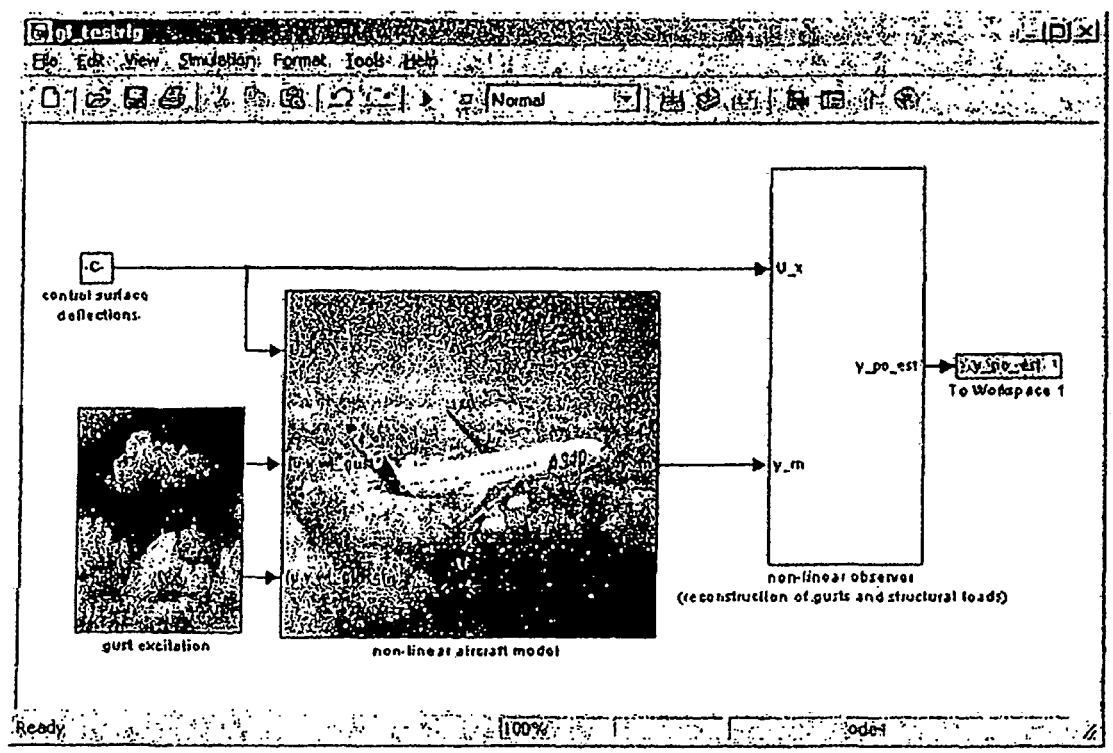
Fig. 5: Simulink model for testing observer

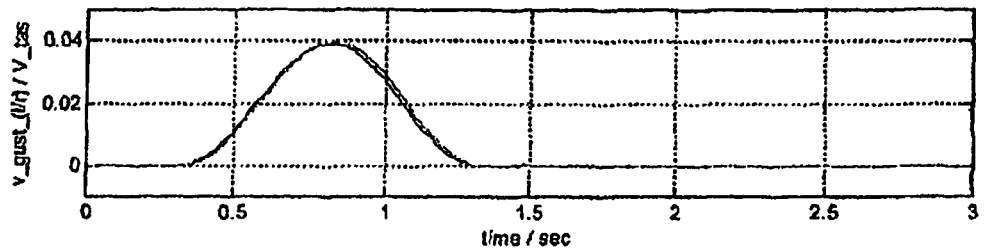

Fig. 6: Discrete gust, lateral velocity: disturbing input quantity (thin), estimate (calculation) from the observer (thick)

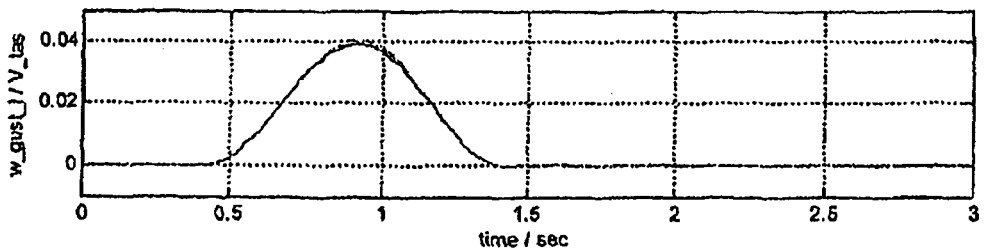

Fig. 7: Discrete gust, vertical velocity, left-hand side: disturbing input quantity (thin), estimate (calculation) from the observer (thick)

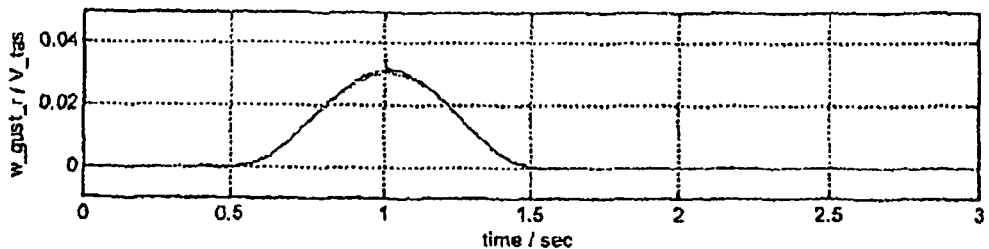

Fig. 8: Discrete gust, vertical velocity, right-hand side: disturbing input quantity (thin), estimate (calculation) from the observer (thick)

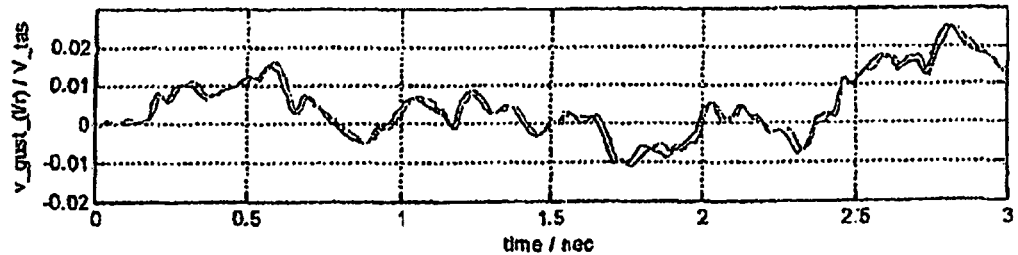

Fig. 9: *Continuous turbulence, lateral velocity: disturbing input quantity (thin), estimate (calculation) from the observer (thick)*

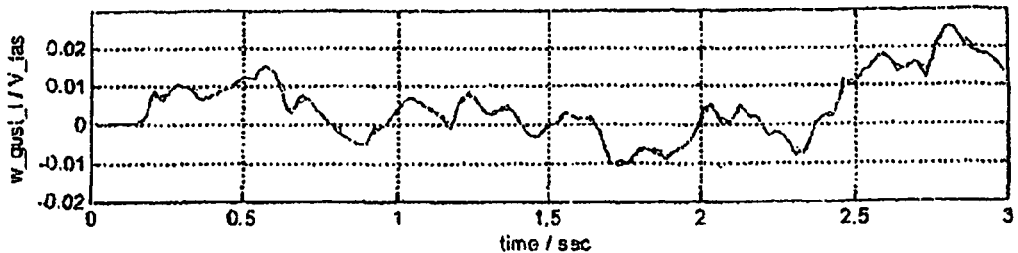

Fig. 10: *Continuous turbulence, vertical velocity, left-hand side: disturbing input quantity (thin), estimate (calculation) from the observer (thick)*

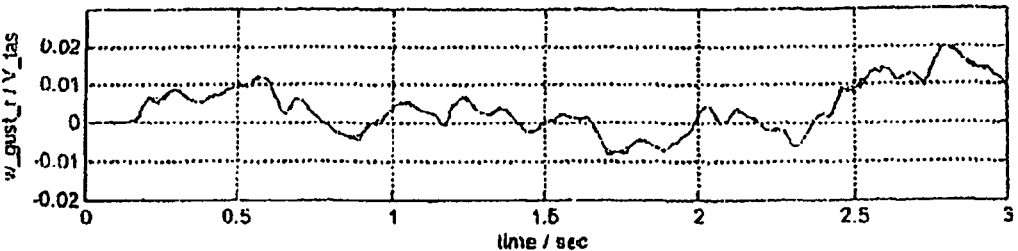

Fig. 11: *Continuous turbulence, vertical velocity, right-hand side: disturbing input quantity (thin), estimate (calculation) from the observer (thick*

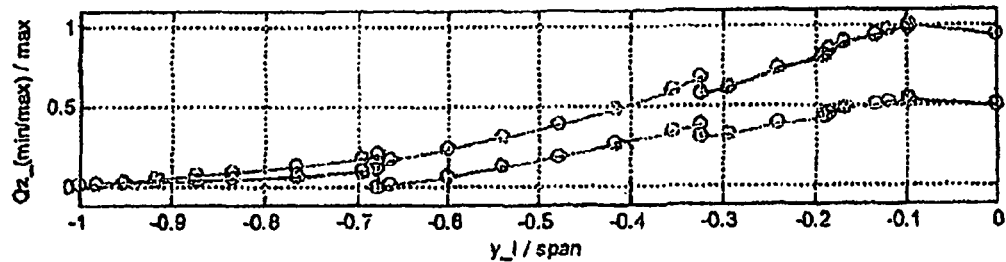

Fig. 12: *Wing shear forces caused by continuous turbulence: wing model (thin), estimate (calculation) from the observer (thick)*

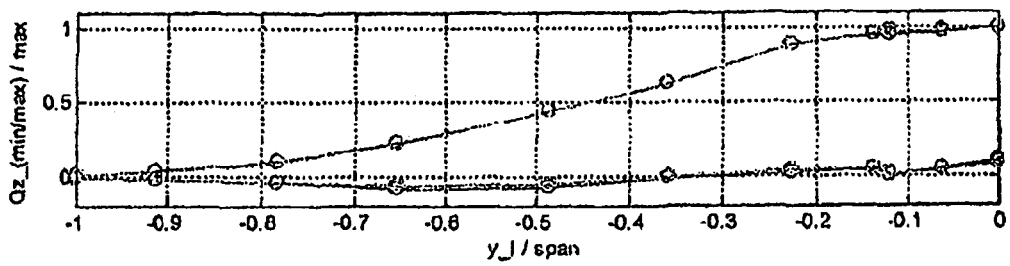

Fig. 13: *Shear forces on the horizontal tail fin caused by continuous turbulence: wing model (thin), estimate (calculation) from the observer (thick)*

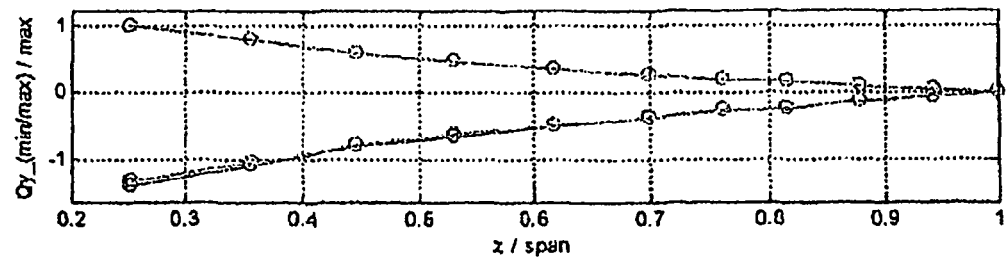

Fig. 14: *Shear forces on the vertical tail fin caused by continuous turbulence: wing model (thin), estimate (calculation) from the observer (thick)*

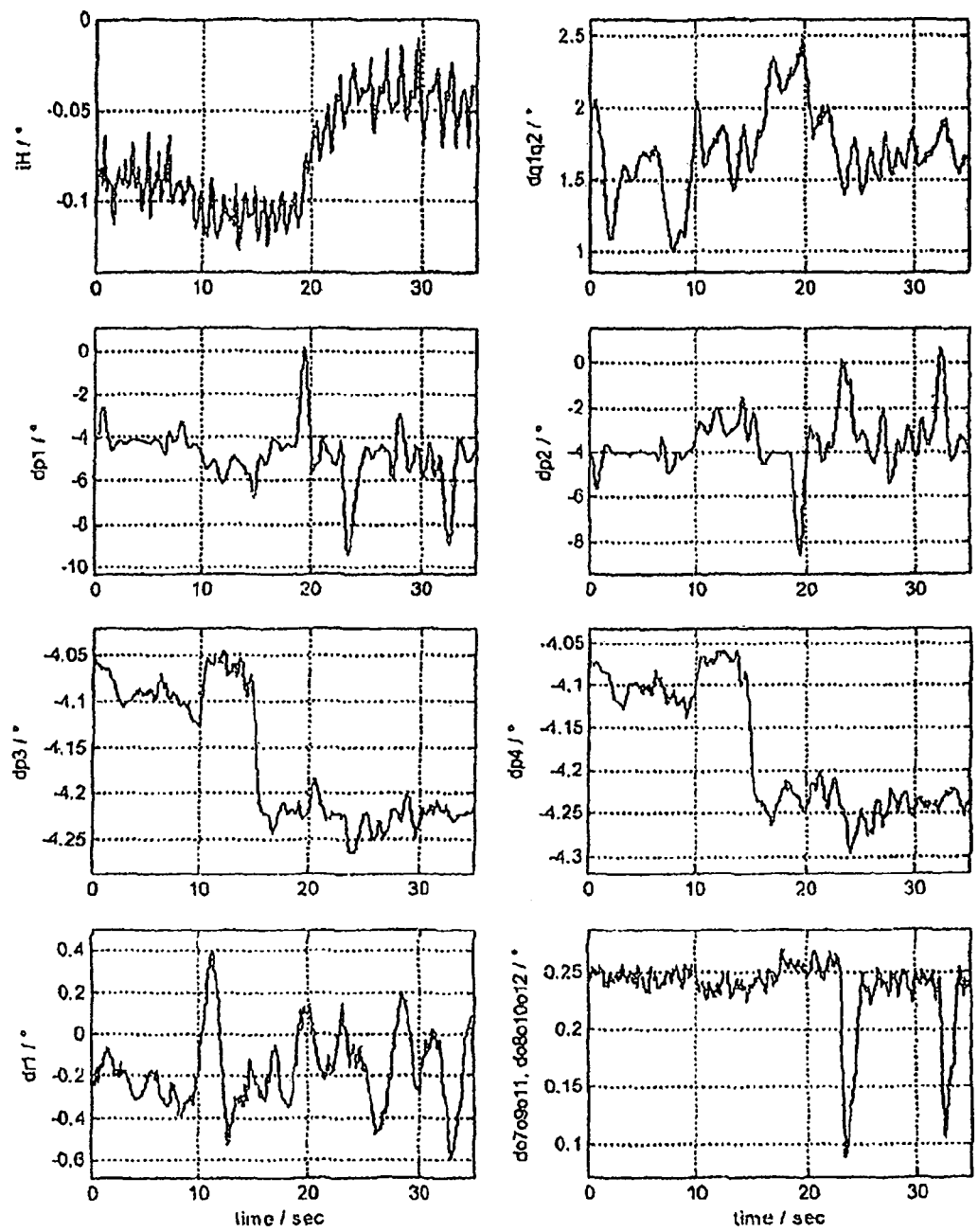
Fig. 15: *Control face settings from the test flight*

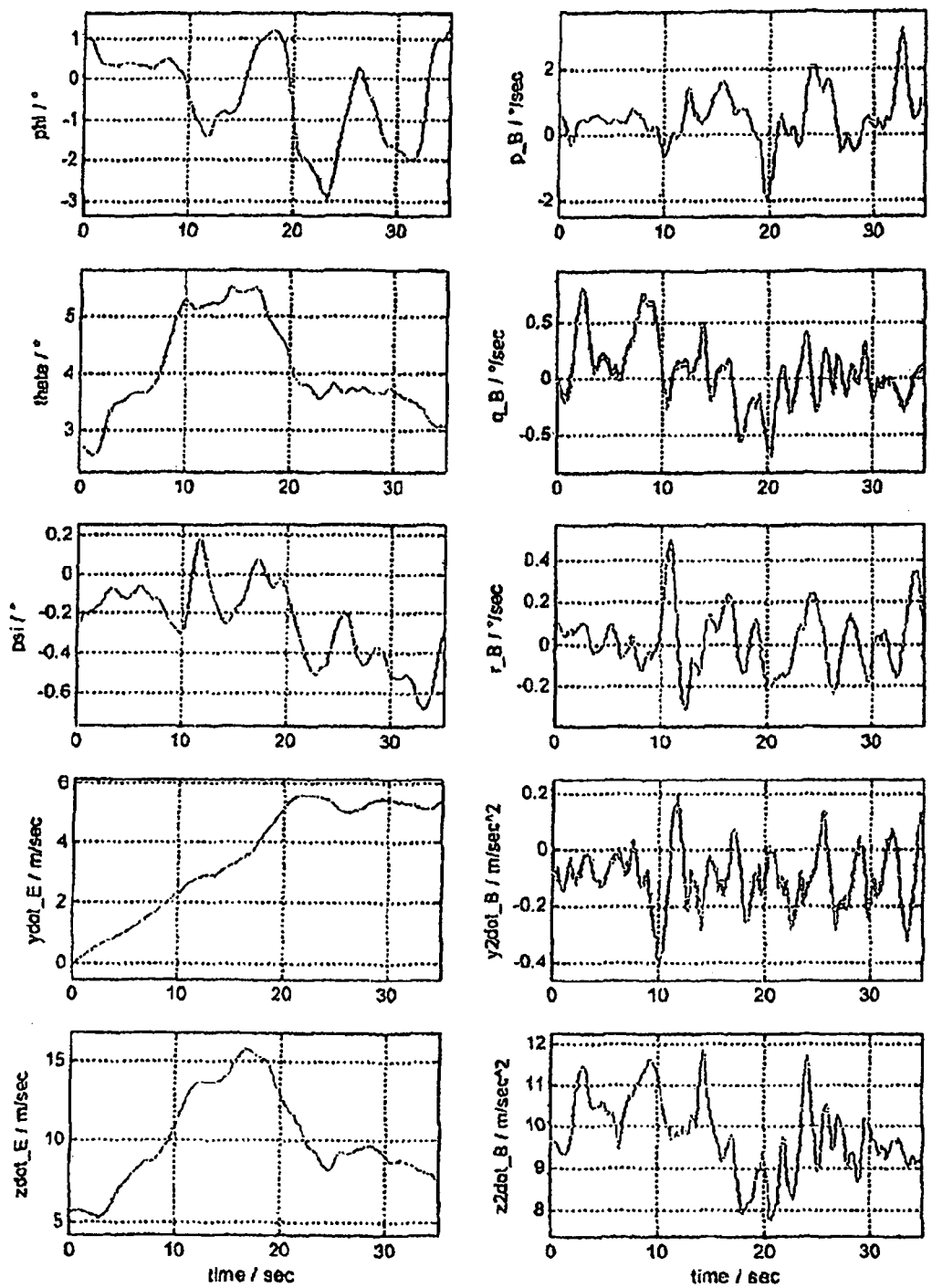
Fig. 16: *Measured value output quantities from the test flight (thin) and estimates (calculations) from the observer*

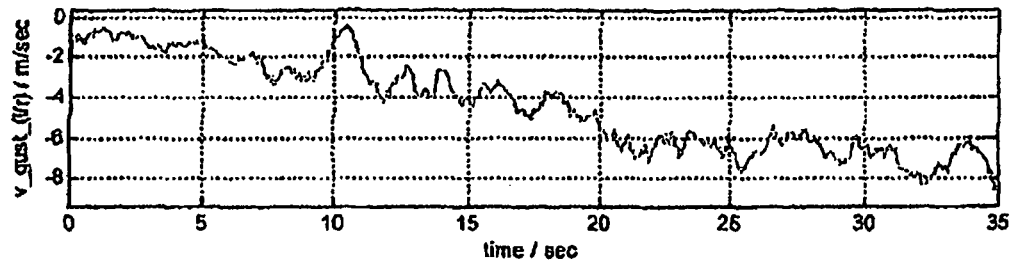
Fig. 17: *Estimate (calculation) of the lateral gust velocity*
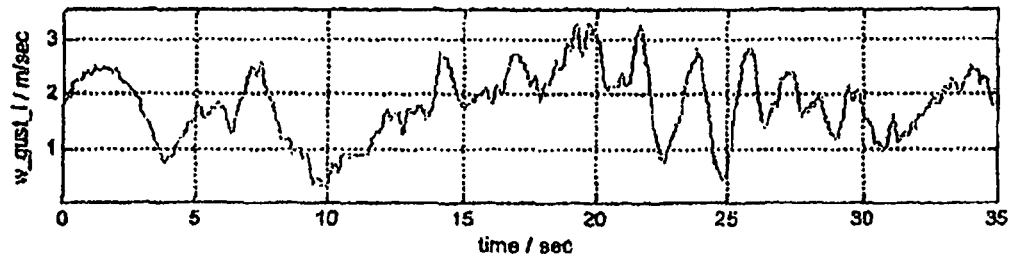
Fig. 18: *Estimate (calculation) of the lateral gust velocity, left-hand side*
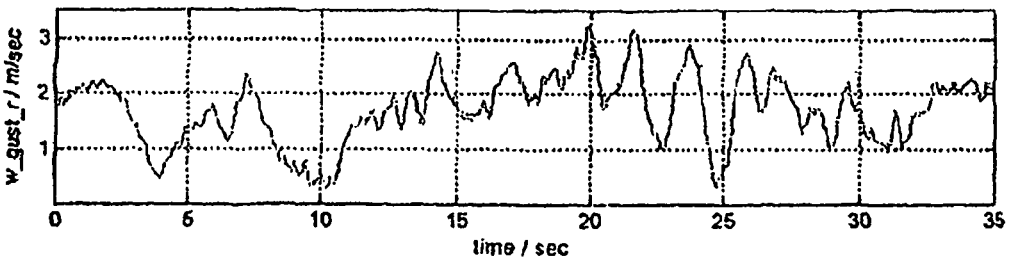
Fig. 19: *Estimate (calculation) of the lateral gust velocity, right-hand side*

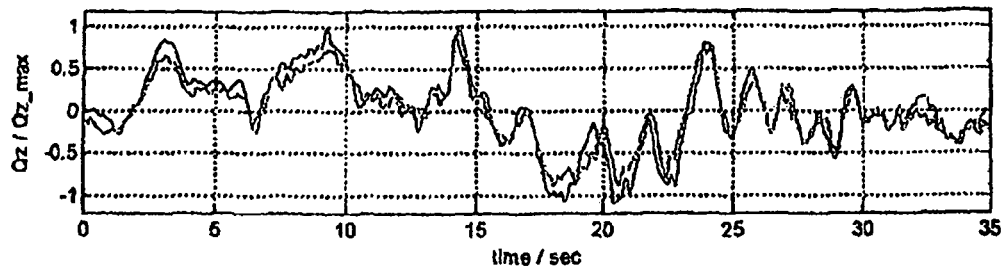

Fig. 20: *Shear forces close to the right wing root (y = 0.38): measurement (thin) and estimate (calculation) from the observer*

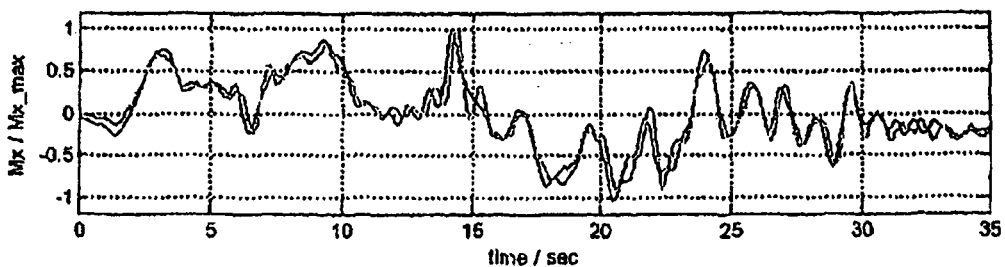

Fig. 21: *Bending moment close to the right wing root: measurement (thin) and estimate (calculation) from the observer*

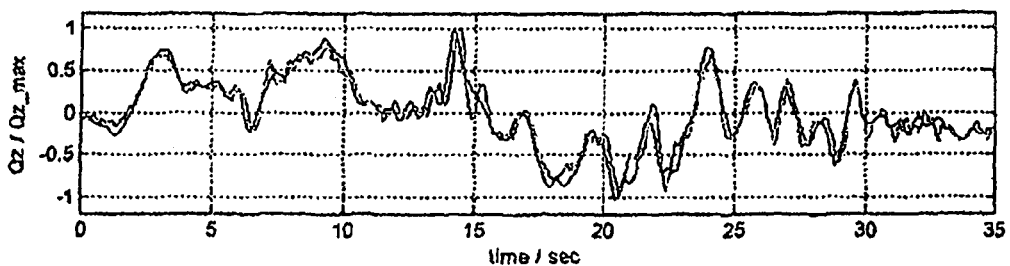

Fig. 22: *Shear forces close to the inner right engine (y = 8.95 m): measurement (thin) and estimate (calculation) from the observer*

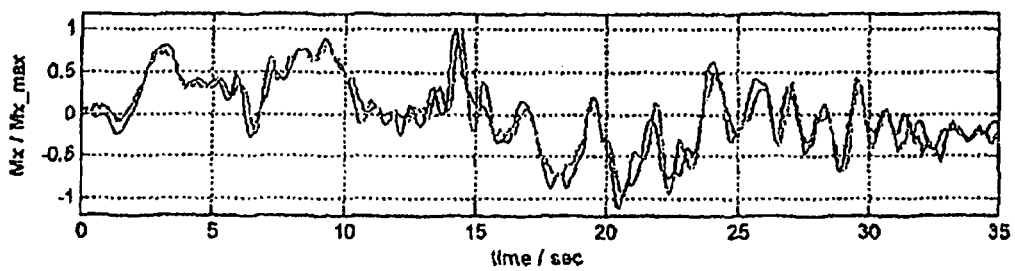

Fig. 23: *Bending moment close to the inner right engine: measurement (thin) and estimate (calculation) from the observer*

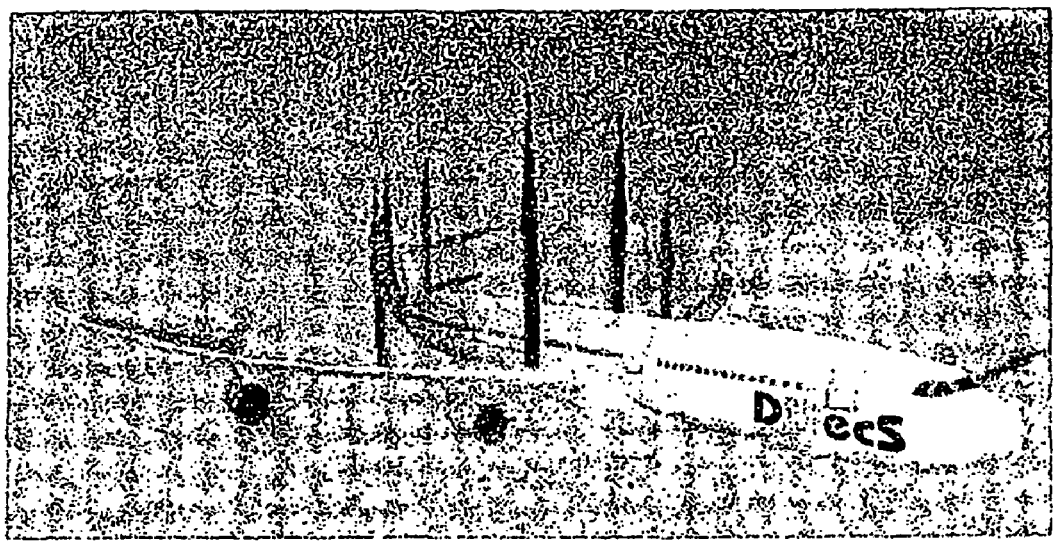
Fig. 24: Animation of the aircraft movement, gust velocities (light arrows) and loads (dark arrows)

METHOD FOR RECONSTRUCTING GUSTS AND STRUCTURAL LOADS AT AIRCRAFT, IN PARTICULAR PASSENGER AIRCRAFT

REFERENCE TO RELATED APPLICATIONS

This application claims the benefit of the filing date of the German patent application DE 10 2005 058 081 filed on Dec. 6, 2005, the disclosure of which is hereby incorporated by reference.

BACKGROUND OF THE INVENTION

The invention relates to a method for reconstructing gusts and/or structural loads at aircraft, in particular passenger aircraft.

Hitherto, it has only been possible to a limited extent to back-calculate external influences such as gusts or turbulence which may result in increased structural loads at any locations at an aircraft, in particular at a passenger aircraft. Dynamic loads could certainly be measured but it was not possible to infer the perturbation or disturbance.

SUMMARY OF THE INVENTION

It is an object of the invention to provide a method whereby structural loads at an aircraft can be simulated and their excitation can be reconstructed. In particular, a method of this type is to be provided which can be implemented both after the flight but in particular, also during a flight.

The object is achieved by a method having the features of claim 1. Exemplary further developments and embodiments of the method according to the invention are specified in the dependent claims.

An advantage of the method according to the invention is that it allows rapid estimates to be made as to whether particular inspections and/or repairs to a structure are necessary or not following gusts and/or manoeuvres in the limiting region or other excitations. This possibility ensures an increased safety standard, minimises ground times as well as operating costs and at the same time increases the availability of aircraft.

BRIEF DESCRIPTION OF THE DRAWINGS

Exemplary embodiments of the method according to the invention are explained hereinafter with reference to the drawings.

In the figures:

FIG. 1 is a schematic diagram of the method according to the invention for reconstructing gusts and/or structural loads at an aircraft by an observer according to one exemplary embodiment of the invention;

FIG. 2 is a block diagram of the structure of a nonlinear model of the aircraft such as forms the basis of the observer according to the exemplary embodiment of the invention from FIG. 1;

FIG. 3 is a diagram similar to FIG. 1 which illustrates how the respective quantities used at the observer are allocated to the aircraft distance (plant);

FIG. 4 is a diagram of a graphical user interface of a so-called system optimization tool (SO tool) used in the method according to the invention;

FIG. 5 is a screen shot of a simulink model for the observer test;

FIGS. 6, 7 and 8 show the lateral velocity, the vertical velocity on the left-hand side or the vertical velocity on the right-hand side of a discrete gust as a disturbance input quantity (thin line) and observer calculation (thick line);

FIGS. 9, 10 and 11 each show a diagram of the lateral velocity, the vertical velocity on the left-hand side or the vertical velocity on the right-hand side plotted as a function of time for continuous turbulence as a disturbance input quantity (thin line) and calculated by the observer (thick line);

FIGS. 12, 13 and 14 are diagrams of the wing shear forces, the shear forces on the horizontal tail fins or the vertical tail fin plotted as a function of the span or length normalised to unity for the aircraft model (thin line) and the calculation of the observer (thick line);

FIG. 15 shows the positions of various control faces as a function of time from a test flight;

FIG. 16 shows measurements of various output quantities as a function of time from a test flight (thin line) and calculations of the observer (thick line);

FIGS. 17, 18 and 19 show calculations of the lateral gust velocity, the vertical gust velocity on the left-hand side or the vertical gust velocity on the right-hand side for the test flight described with reference to FIGS. 15 and 16;

FIGS. 20, 21, 22 and 23 give the shear force close to the right wing root, the bending moment close to the right wing root, the shear force near the inner right engine or the bending moment near the inner right engine as a function of time for the test flight described with reference to FIGS. 15 and 16 as a measured quantity (thin line) and calculation by the observer (thick line); and FIG. 24 is a screen shot of an animation of the aircraft movement, the gust velocities (light arrows) and the structural loads (dark arrows).

DETAILED DESCRIPTION OF THE EMBODIMENTS

When operating a modern commercial aircraft, it is important to know the internal loads (bending moments and shear forces) acting on the aircraft structure during the flight. The loads are induced by manoeuvres ordered by the pilot or by the electronic flight control system (EFCS) or by turbulences and discrete gusts through which the aircraft flies. However, these loads cannot be monitored by measurements at any arbitrary desired location of the aircraft. According to the invention, these loads are rather reconstructed by calculation from the flight data available for a commercial aircraft (e.g. Euler angle, "body rates", accelerations, GPS data), the positions of the control faces and using a mathematical model of the aircraft. In addition, the gust velocities should be estimated by suitable means to calculate the loads caused by the gusts.

The reconstruction of the loads can be of major benefit for the operator of the aircraft. One benefit arises from the reaction to intermediate cases, e.g. when the aircraft flies through a severe gust. By knowing the loads at any location of the aircraft structure, it can easily be decided whether a load has exceeded permissible limiting values which necessitate grounding and an extensive inspection of the structure. If the information relating to the loads is already available during the flight and reveals that no critical loads have occurred, unnecessary ground time of the aircraft can be avoided.

A reconstruction of the loads running during the flight is also important for life-time monitoring systems which allow the operator to carry out an inspection as necessary and to optimise the intervals for structural maintenance of the aircraft. It can be provided that a special inspection of parts of the structure is only carried out if particular loads have occurred during operation of the aircraft. In this way, inspection intervals could be increased and inspections only conducted on special parts of the structure, thus reducing the operating costs of the aircraft and increasing its availability.

In addition, the gust velocities acting as unknown input quantities on the aircraft should be estimated to reconstruct the internal loads. According to the invention, this should be carried out with the aid of an observer based on a nonlinear mathematical model of the aircraft.

The principle of the observer is shown schematically in FIG. 1 for the tasks described. The observer is a parallel model of the aircraft which is controlled by the pilot and EFCS commands and corrected by measurements which reflects the resulting aircraft motion. By suitably extending the modelling of the aircraft used to design the observer, the velocities of gusts and/or turbulences acting as unknown input quantities at the aircraft can be incorporated in the observation process. The output quantities of the observer are estimates or calculations of the gust velocities (hereinafter, only "gust velocities" is used for short but this should be understood as the velocities of gusts, turbulences and other perturbations in steady-state air flows and the structural loads which result from the gusts (and turbulences etc.) as well as from the control face commands. The estimated gust velocities are advantageous by-products during the reconstruction of the structural loads at any desired location of the aircraft.

The basis of the observer design is a nonlinear model of the aircraft. In this context, the flexibility or the elastic properties of the aircraft structure is taken into account in the model to allow the reconstruction of the internal loads at any desired location of the structure. Unknown lateral and asymmetric vertical gust velocities are jointly taken into account as input quantities of the observer by extending the model of the aircraft by so-called disturbance models.

In the exemplary model described here, the nonlinear observer is designed as a stationary Kalman filter with noise processes at the input and output quantities of the aircraft. The observer design is made in a nonlinear parameter optimisation by minimising a quadratic quality functional for the errors of estimation of the observer.

The structure of the nonlinear aircraft model according to the present exemplary embodiment is shown in FIG. 2. A set of sub-models reflects the individual disciplines used to generate the aircraft model. In the exemplary embodiment, the aircraft model was coded in the module-oriented real-time simulation environment VarLoads (Variable Loads analysis environment) which is based on MATLAB/Simulink. A detailed description of the model and simulation environment is given in [1], J. Hofstee, Th. Kier, Ch. Cerulli, G. Looye: A variable, full flexible dynamic response analysis tool for special investigations (VarLOADS), IFASD 2003, Amsterdam, The Netherlands, June 2003.

The sub-model "mechanical structure" shown in FIG. 2 represents the model of the flexible structure of the aircraft. It combines the nonlinear equations of motion (EQM) of the rigid body with all six degrees of freedom (DoF) in order to simulate a wide range of flight manoeuvres and a set of linear equations of motion (EQM) for the elastic movement of the aircraft structure. This model is derived from a complete finite element model in which the degrees of freedom are reduced by static condensation whereby the grid points have been allocated corresponding point masses. An additional modal reduction can further reduce the elastic degrees of freedom to the number of elastic modes which are substantial for the application observed. For an Airbus A340-300 which is to be considered subsequently as an example, the first forty elastic modes with the lowest frequencies are included in the model in order to calculate the loads at the observation locations between the grid points of the flexible structure with sufficient accuracy. The external forces $P_n^{ext}$ which drive the equations of motion result from air flow and drive thrust.

The aerodynamic forces $P_a^{aero}$ from the air flow are modelled in the sub-model "aerodynamics". These forces are calculated using so-called aerodynamic strips which are placed over the aircraft structure (fuselage, wings, tail assembly etc.). The strips acting on the forces are functions of the true air velocity $V_{tas}$ and the air density $\rho$, the control face positions $u_x$, the movement of the rigid body and the elastic movement (angle of attack) of the aircraft, as well as the gust velocities $v_{gust,l}$ and $v_{gust,r}$ on the left- or right-hand side of the aircraft. For slow control face adjustments and aircraft movements, these are modelled using steady-state aerodynamic theory. The corresponding aerodynamic influential coefficients are derived from wind tunnel measurements. A discontinuous (delayed) development of aerodynamic forces results from rapid variations of the control face positions and rapid variations of the angle of attack for the individual strips caused by the elastic movement of the aircraft structure and the excitation by gusts, turbulences etc. These discontinuous or non-steady-state forces are calculated separately by using Wagner and Küssner functions and are superposed. In addition, the effects of downwash on the tail in the horizontal direction and sidewash (caused by variations in the sideslip angle) on the tail in the vertical direction are included in the aerodynamic model. Furthermore, the time delays at each individual strip are taken into account for gusts, "downwash" and sidewash".

The aerodynamic forces at the force application points of the individual strips are allocated to the next grid points of the mechanical structure.

The propulsion forces $P_a^{prop}$ are calculated in a "drive" sub-model. In the exemplary model described here the engine forces are compensated by the resistance forces on the aircraft for the angle of attack valid for a steady-state 1 g-level flight and for constant forward thrust.

Another sub-model shown in FIG. 2 is the "signal selection" sub-system which delivers the measured quantities $y_m$ required for the observer design.

The internal loads $p_c^{int}$ (bending moments and shear forces) at the observation locations of the aircraft structure are calculated in a sub-system "structural loads". These signals are the target quantities for the load calculation process. The loads are calculated by a force summation method, as is specified for example in [2] H. HenrichfTeise, J. Hofstee, L. Bensch, D. Pohl, L. Merz: Gust load alleviation of a commercial transport aircraft, IFASD 2003, Amsterdam, The Netherlands, June 2003.

The model of the aircraft described above is used as a distance model for designing the observer. It is analysed hereinafter in a first formulation in state space using the first-order nonlinear differential equation $$\dot{x}_p = f_p(x_p, u_{pc}, u_{pd}) \tag{1}$$

and the initial state vector $x_p(t=0)=x_{p0}$. The state vector of the distance model, i.e. of the aircraft (index p)

$$x_p = \begin{bmatrix} x_{p,rigid} \\ x_{p,elastic} \end{bmatrix} \tag{2}$$

can be divided into a sub-state vector $x_{p,rigid}$ for the movement of the rigid body and a vector $x_{p,elastic}$ with the states describing the elastic movement of the aircraft. The commands at the control faces are combined in a control input vector (index c) $u_{pc}$ of the distance model $$\underline{u}_{pc} = \underline{u}_x = \begin{bmatrix} u_{x,1} \\ u_{x,2} \\ \vdots \\ u_{x,20} \end{bmatrix} \quad (3)$$

wherein $u_{x,1}, u_{x,2} \ldots u_{x,n}$ (here with n=20) are the settings or adjustment values of rudders, elevators, ailerons, spoilers, stabilisers etc.

The gust velocities, i.e. the velocities of gusts, turbulences and similar flows on the left- and on the right-hand side of the aircraft are unknown disturbance quantities for the system. These quantities are combined in a disturbance input vector (index d) for the distance model $$\underline{u}_{pd} = \begin{bmatrix} \underline{V}_{gust,l} \\ \underline{V}_{gust,r} \end{bmatrix} = \begin{bmatrix} u_{gust,l} \\ v_{gust,l} \\ w_{gust,l} \\ u_{gust,r} \\ v_{gust,r} \\ w_{gust,r} \end{bmatrix} \quad (4)$$

wherein $u_{gust}$, $v_{gust}$, $w_{gust}$, (describe the corresponding longitudinal, lateral and vertical velocity components in a coordinate system assigned to the aircraft.

The gust velocities on the left- and on the right-hand side combined in the disturbance input vector $u_{pd}$ (index d) may contain further velocity components as unknown disturbance quantities $$\underline{u}_{pd} = \begin{bmatrix} v_{gust,front} \\ v_{gust,fin} \\ v_{gust,wing,l} \\ v_{gust,wing,r} \end{bmatrix} \quad (4a)$$

wherein $v_{gust,front}$, $v_{gust,fin}$, $w_{gust,wing,l}$, $w_{gust,wing,r}$ describe the corresponding frontal or lateral velocity components in the coordinate system of the aircraft.

Measurement signals for standard measured values such as those available in a commercial aircraft are the Euler angles ($\Phi$, $\Theta$, $\Psi$) and "body rates" ($p_B$, $q_B$, $r_B$) in the coordinate system of the aircraft. In addition, the lateral and vertical velocities ($y_E$, $z_E$) of the centre of gravity in the reference system of the environment and the lateral and vertical accelerations ($\ddot{y}_B$, $\ddot{z}_B$) of the aircraft body close to the centre of gravity in the coordinate system of the aircraft are available for the observer. All these signals are modelled using the measurement output equation (index m)

$$\underline{y}_{pm} = \begin{bmatrix} \Phi \\ \Theta \\ \Psi \\ p_B \\ q_B \\ r_B \\ \dot{y}_E \\ \dot{z}_E \\ \ddot{y}_B \\ \ddot{z}_B \end{bmatrix} = \underline{g}_{pm}(\underline{x}_p, \underline{u}_{pc}, \underline{u}_{pd}) \quad (5)$$

The aim of the observer design is to reconstruct the internal loads. In order to achieve this, the unknown gust velocities are to be estimated or calculated, as will be seen subsequently. These variables are provided by the target output equation (index o)

$$\underline{y}_{po} = \begin{bmatrix} P_c^{int} \\ \underline{V}_{gust,l} \\ \underline{V}_{gust,r} \end{bmatrix} = \underline{g}_{po}(\underline{x}_p, \underline{u}_{pc}, \underline{u}_{pd}) \quad (6)$$

In the equations of the aircraft model given above, the gust velocities appear as input quantities and as output quantities. As will be described hereinafter, these gust velocities can be included in the observer design by a suitable extension of the distance model.

The aim is to reconstruct the internal loads at the aircraft structure caused by flight manoeuvres and excitations through gusts, turbulences etc. at any desired location of the aircraft structure. For a normal flight without gusts the loads on the aircraft structure are merely caused by the commands of the pilot or the EFCS. These so-called manoeuvre loads can be reconstructed using the model of the aircraft described using FIG. 2 and using the measured control face settings as input quantities. However, if the aircraft fliesthrough gusts or turbulences, additional gust loads are superposed on the manoeuvre loads. In order that these loads can also be reconstructed, the unknown gust velocities at the disturbance inputs of the aircraft are also required. Direct measurements of gust velocities by sensors installed on the aircraft are either not available or not adequate, there being two reasons for this. Firstly, the sensors are subject to the movement of the aircraft so that they not only measure the gust but also the movement. Secondly, the sensors available today are only capable of measuring the gust at one location usually situated at the nose of the aircraft. Hence, two-dimensional gusts such as isolated eddies which result in rolling of the aircraft are not detected.

A nonlinear observer for calculating multi-dimensional gusts, turbulences etc. and the structural loads resulting therefrom and from manoeuvres is described hereinafter. This approach focuses only on the lateral and vertical velocity components of the gusts $v_{gust}$ and $w_{gust}$ from Equation (4). At the present time, longitudinal gusts are not taken into account. The gust velocities are modelled by the disturbance model $$\dot{x}_d = f_d(x_d, u_d, v_d), \, x_d(t=0)=0$$

$$y_d = g_d(x_d) \quad (7)$$

in order to include them in the observation process. They are generated by the output vector yd and by suitable disturbance input quantities of the model in the vector $u_{pd}$. Substituting the disturbance input quantity at the distance model by the output quantity of the disturbance model, i.e. $u_{pd}=y_d$ in Equation (1) yields the nonlinear differential equation $$\begin{bmatrix} \underline{x}_p \\ \underline{x}_d \end{bmatrix}^\circ = \begin{bmatrix} \underline{f}_p(\underline{x}_p, \underline{u}_{pc}, \underline{g}_d(\underline{x}_d), \underline{v}_{pc}) \\ \underline{f}_d(\underline{x}_d, \underline{u}_d, \underline{v}_d) \end{bmatrix} \quad (8)$$

$$\dot{\underline{x}}_a = \underline{f}_a(\underline{x}_a, \underline{u}_{pc}, \underline{u}_d, \underline{v})$$

of the extended distance model. The state vector $x_a$ contains the states $x_p$ of the aircraft model and the states $x_d$ of the disturbance model. The vector processes $v_{pc}$ and $v_d$ with the process noise at the control and disturbance inputs have been added to the extended distance model to allow an observer design similar to a Kalman filter design as described in [3]B.

Friedland: Control System Design—An introduction to state-space methods, McGraw-Hill, 1986. The process noise is combined in the vector v.

From Equation (5), the measurement output equation of the extended distance model becomes $$\underline{y}_{pm} = \underline{g}_{pm}(\underline{x}_p, \underline{u}_{pc}, \underline{g}_d(\underline{x}_d)) + \underline{w} \qquad (9)$$
$$= \underline{g}_{am}(\underline{x}_a, \underline{u}_{pc}) + \underline{w}$$

wherein the vector process w adds the measurement noise at the distance outputs to the design of the observer similarly to a Kalman filter. As is usual in the theory of the Kalman filter, the individual noise processes in the vectors v and w are assumed to be uncorrelated Gaussian white noise with known constant intensities.

Substantial values for the intensities of the measurement noise can be deduced from the specifications of the sensors used, see (4) H. Henrichfreise: Prototyping of a LQG Compensator for a Compliant Positioning System with Friction. TRANSMECHATRONICS—Development and Transfer of development systems of mechatronics, HNI-Verlagsschrifl-reihe, Vol. 23, $1^{st}$ Edition, Paderbom 1997. The paper is available on the CLM website www.clm-online.de. The intensities of the process noise, on the other hand, are used as design parameters, as is shown subsequently.

Finally, substituting the disturbance input in the target output equation (6) leads to the target output equation of the extended distance model $$\underline{y}_{po} = \underline{g}_{po}(\underline{x}_p, \underline{u}_{pc}, \underline{g}_d(\underline{x}_d)) \qquad (10)$$
$$= \underline{g}_{ao}(\underline{x}_a, \underline{u}_{pc})$$

to calculate the structural loads and the gust velocities from the states of the extended model and the control input quantities.

The nonlinear extended distance model from Equations (8) to (10) forms the basis for the observer design.

With the vector functions from the extended distance model, the structure of the observer is given by the following equations, see [5] B. Friedland: Advanced control system design. Prentice Hall, 1996.

$$\dot{\hat{\underline{x}}}_a = \underline{f}_a(\hat{\underline{x}}_a, \underline{u}_{pc}) + L \cdot (\underline{y}_{pm} - \hat{\underline{y}}_{pm}), \hat{\underline{x}}_a(t=0) = \hat{\underline{x}}_{a0} \qquad (11)$$

$$\hat{\underline{y}}_{pm} = \underline{g}_{nm}(\hat{\underline{x}}_a, \underline{u}_{pc}) \qquad (12)$$

$$\hat{\underline{y}}_{po} = \underline{g}_{ao}(\hat{\underline{x}}_a, \underline{u}_{pc}) \qquad (13)$$

The solution of the differential equation of state (11) provides an estimate $\hat{x}_a$ of the state vector of the extended distance model. Equation (11) is driven by the control input vector $u_{pc}$ and the measurement output vector $y_{pm}$ of the distance model which are also the input quantities into the observer (see FIG. 3).

The measurement input is used to form the observer measurement error, the different between the true measured values in the vector $y_{pm}$ and the calculated measured values in the vector $\hat{y}_{pm}$ from Equation (12). These are fed back to the derivative of the state vector of the observer by the amplification matrix L. If this is correctly designed, this feedback has the effect that the calculated measured values follow the true measured values, i.e. the observer measurement errors are almost reduced to zero. For this purpose, the calculated distance model state vector $\hat{x}_d$ in the observer state vector $\hat{x}_a$ should closely follow the distance state vector $x_p$. With unknown disturbance quantities at the disturbance inputs of the aircraft or the distance model in the vector $u_{pd}$ the disturbance model sub-state $\hat{x}_d$ should generate the disturbance model output quantities in $\hat{y}_d$ from Equation (7) which are close to the true disturbance input quantities. Consequently, the disturbance model output quantities in the observer provides estimates for the unknown gust velocities. Together with the internal structural loads at the measuring stations, these are available as observer output quantities in the vector $\hat{y}_{pm}$ calculated from Equation (13).

With the observer structure given by Equations (11) to (13), the only remaining task is to determine the observer amplification matrix L. This is accomplished using an observer design similar to a Kalman filter which is already prepared by adding the noise process to the extended distance model. Since the basic distance model is not linear, the observer amplification matrix is determined by a nonlinear parameter optimisation which is based on a simulation of a system consisting of the extended distance model of the aircraft and the observer (similar to FIG. 3). The extended distance model is excited in this case by discrete white noise processes in the vectors v and w. The simulated time responses are used to calculate the quadratic cost function $$J(L) = \frac{1}{N} \sum_{k=0}^{N-1} (\underline{x}_a(k) - \hat{\underline{x}}_a(k))^T \cdot (\underline{x}_a(k) - \hat{\underline{x}}_a(k)) \qquad (14)$$

which contains the sum of the autocovariances of the observer estimation error for the N simulation steps which are performed. With this design environment which is the same as in a linear Kalman filter design, the observer amplification L is found by numerical minimisation of the cost function J in relation to the elements of the observer amplification matrix L. As explained in [4], the intensities of the process noise in the subvector $v_{pc}$ at the control inputs of the aircraft or the distance model are used to calculate the observer amplification matrix in order to tune the observer in relation to velocity and robustness towards indeterminacies in the control input path of the distance model. Since the disturbance model input $u_d$ into the extended distance model is not known, the intensities of the corresponding noise processes in $v_d$ are set as high as possible in order to make the observer robust towards the fact that the signal is lacking as an observer input quantity.

For the following discussion the observer amplification matrix is partitioned by analogy with the state vector of the extended distance model $$L = \begin{bmatrix} L_p \\ L_d \end{bmatrix} = \begin{bmatrix} L_{p,rigid} \\ L_{p,elastic} \\ ---- \\ L_d \end{bmatrix} \qquad (15)$$

wherein the sub-matrices $L_p$ and $L_d$ are used to feed back the observer measurement errors to the derivative of the distance states or the disturbance model states in the observer. As is clear from Equation (2) for the state vector of the distance model, the sub-matrix $L_p$ can be further divided into feedback amplification matrices $L_{p,rigid}$ and $L_{p,elastic}$. If the number of distance states is now counted, e.g. $n_{p,rigid}=12$) $n_{p,elastic}=80$, and four disturbance model states $n_d=4$ are assumed, for $n_{pm}=10$ measured quantities from Equation (5) a total of 960 elements is obtained for the observer amplification matrix.

It is obviously not logical to design an observer with so many amplification elements, not only with regard to the computing expenditure but also with regard to the convergence of the optimisation problem described above. Therefore, only a few selected elements will be used for the observer amplification matrix in the design process, these being selected for reasons such as stability and response speed. All other elements will be set to zero. The studies conducted in connection with the present exemplary embodiment relating to the observer amplification matrix have revealed that twelve selected elements are already sufficient to ensure good observer behaviour as will be seen subsequently. In addition, this simplification also dramatically reduces the computing expenditure for the observer design and the real time implementation.

As has already been mentioned further above, the observer design was carried out by a nonlinear parameter optimisation based on time responses obtained by simulation. This was carried out using a so-called System Optimization Tool (SO Tool), see [6]. S. Klotzbach, S. Oedekoven, O. Grassmann: Optimisation in the mechatronic development: process. VDI Mechatronics Conference 2003, Fulda, Germany, 2003, available at DMecS-website www.dmecs.de which was developed on the basis of algorithms from the MATLAB Optimization Toolbox. The system to be optimised should be made available as a Simulink model. The SO tool contains a graphical user interface under which the user can conveniently load the simulation model of the system, define the target quantities and interactively select the optimisation parameters for an optimisation run. FIG. 4 shows the graphical user interface of the SO tool.

Test and simulation results for an Airbus 340-300 will be presented hereinafter.

The tests were carried out using the Simulink model shown in FIG. 5 which implements the block diagram from FIG. 3 in which the nonlinear observer is linked to the aircraft model. An additional subsystem was included to generate gust velocities for cosinusoidal discrete gusts and continuous turbulences as excitations. The subsystem provides velocities acting on the left and right side of the modelled aircraft.

By setting the control inputs $u_{pc}=u_x$ of the aircraft model and the observer to zero, manoeuvres and manoeuvre loads are not taken into account hereinafter. This was carried out because the observer was designed on the basis of a nominal modelling of the aircraft (the distance model for the observer design agrees with the aircraft model) so that the manoeuvre loads are correctly reconstructed by the observer. Only the disturbance excitation of the system by gusts is relevant with regard to the assessment of the performance of the observer.

FIGS. 6 to 8 show the lateral and vertical gust velocities acting on the aircraft and the corresponding estimates by the observer. The gust velocities were scaled to the true air speed at the aircraft.

Whereas the lateral gust velocities are identical on both sides of the aircraft, the vertical gust velocities were assumed to be different for the left and the right side of the aircraft. They affect the aircraft at different times and with different amplitudes.

The figures in which the disturbance input quantities are reproduced by thin lines and the estimates made by the observer are given by thick lines show that the lateral and asymmetric vertical gust velocities are reproduced highly accurately.

FIGS. 9 to 11 show an excitation by multi-dimensional continuous turbulence which comes closer to reality where the lateral and vertical gust velocities acting on the aircraft and the estimates by the observer are respectively reproduced by thin or thick lines. The time profile shows that the turbulence is reconstructed with the same high accuracy as the discrete gust velocities. Using the reconstruction of the gust velocities, the observer is able to calculate reliable estimates for the loads caused thereby. This is shown by so-called envelope curves which include the maximum and minimum values of the individual loads from the available monitoring locations over the corresponding parts of the aircraft structure. These envelope curves allow a quick glance at the maximum loads over the entire aircraft structure which arise in a particular incident or during an entire flight. This is very useful for estimating whether the loads on a part of the aircraft have exceeded particular predefined values.

FIGS. 12 to 14 show the envelope curves for the shear forces over the wing and the horizontal and vertical tail fins caused by the continuous excitation of turbulences shown in FIGS. 9 to 11. Since the loads for both sides of the aircraft are equally well reconstructed, only the left side of the aircraft is taken into account in the figures. The forces are scaled to the maximum positive value within the figure and plotted over the spans of wings and tail fins normalised to unity. If desired, the bending moments or the loads at other aircraft components, e.g. on the fuselage, can also be plotted.

There is almost no difference between the envelope curves in FIGS. 12 to 14 for the shear forces of the aircraft model and the observer. The structural loads are very well reconstructed by the observer for all measuring stations (these positions are marked by crosses). The various measuring positions are available by modelling the aircraft as a flexible system, as described further above. This makes it possible to calculate the loads at any desired location of the aircraft structure.

In FIG. 12 the steps in the shear forces along the aircraft wing are caused by the weight of the engines in the basic A340-3000 aircraft model.

The results described here were obtained for an observer which was designed on a nominal aircraft model (the distance model for the observer design agrees with the aircraft model). With a real aircraft, however, deviations from the aircraft model occur both for the model structure and for the model parameters (e.g. weight distribution, Mach number, altitude). Studies have shown that the effect on the estimated loads is tolerable for deviations which are not too large. The errors are partially compensated by greater deviations in the estimate of the gusts or turbulences. Results obtained in a test flight with a real aircraft are presented hereinafter. The time profile of all control face positions (control input quantities) and the measured quantities was recorded during the flight. The data thus collected were evaluated in a simulation carried out after the flight, using only the observer of the Simulink model shown in FIG. 5.

FIGS. 15 and 16 show the control face positions and the measured quantities which were recorded during a test flight with an Airbus A340 FT aircraft. The aircraft was subjected to manoeuvres of the pilot and also turbulences. The observer worked very well in relation to the observer measurement error. The estimates by the observer in FIG. 16 follow the measured quantities from the test flight with a very small error so that the differences are barely discernible in the figures.

FIGS. 17 to 19 shows the estimates on the left and right side of the aircraft which likewise provide good results with regard to the observer measurement error. Whereas the estimate for the lateral gust velocity is the same for both sides of the aircraft, the estimates for the vertical gust velocities on the left and the right side of the aircraft differ.

The estimates for the gust velocities and the control face positions were input to the aerodynamic sub-model contained in the observer. The internal structural loads at the measuring stations were constructed by allocating the resulting aerodynamic forces to the grid points of the mechanical aircraft structure. The test aircraft was fitted with stress sensors at some of these measuring stations which made it possible to detect the actual loads on the aircraft structure. FIGS. 20 to 23 compare these loads at different positions on the right wing with the corresponding estimates of the observer. FIG. 20 and FIG. 21 show the results for the shear force and the bending moment at a location near the right wing root. A comparison for the actual and the calculated loads at a different location near the inner right engine is given in FIG. 22 and FIG. 23.

The results in FIGS. 20 to 23 demonstrate that the observer gives very good estimates of the loads of a real aircraft. The slight deviations are the consequence of the differences between the aircraft model used for the observer design and the real aircraft. Such deviations occur in the aircraft structure (e.g. number of elastic modes) and in the parameters (e.g. weight distribution, Mach number, altitude) and can never be completely avoided in the real world. It is shown however that the observer is sufficiently robust in regard to such influences.

Since the observer measurement errors are small and the structural loads are well reconstructed, it can be assumed with a high degree of certainty that the estimates of the gust velocities in FIGS. 17 to 19 are reliable.

An important tool for understanding the aircraft movement corresponding to the time profiles shown previously is a three-dimensional animation of the aircraft. This can show the control face adjustments, the complete three-dimensional movement of the aircraft and the elastic movement of the aircraft structure. Additional quantities can be indicated by arrows which vary in their length according to the magnitude of the respective quantity. FIG. 24 shows an image of the Airbus 340-300 aircraft considered in the exemplary embodiment described hereinbefore. The animation is driven with the observer input quantities (i.e. the control face positions and the measured quantities) and the estimated values of the observer (i.e. the elastic deformation of the aircraft structure, gust velocities and internal structural loads). The gust velocities and the loads at different locations of the aircraft structure are shown by light or dark arrows.

The method according to the invention can be used to reconstruct loads occurring at any positions of the structure of an aircraft caused by flight manoeuvres and other influences such as gusts and turbulences during or after the flight. Quick estimates can therefore be made as to whether inspections of the structure are optionally necessary after particular events. The standard of safety can be increased, ground times and operating costs can be minimised and at the same time, the availability of aircrafts can be improved.

It should be noted that the term 'comprising' does not exclude other elements or steps and the 'a' or 'an' does exclude a plurality. Also elements described in association with different embodiments may be combined.

It should be noted that the reference signs in the claims shall not be construed as limiting the scope of the claims.

The invention claimed is:

1. A computer-implemented method for reconstructing gusts and structural loads at aircrafts, comprising:
   a) generating an observer on the basis of a nonlinear model of the aircraft which describes the movement of the aircraft in all six degrees of freedom (DoF) and the elastic motion of the aircraft structure;
   b) continuously supplying all the data and measurements substantial for the description of the state of the aircraft to the observer; and
   c) calculating the gust velocities and structural loads by the observer from the supplied data and measurements.

2. The computer-implemented method of claim 1, wherein structural loads generated by flight manoeuvre and/or gusts and/or turbulences are calculated for any points of the aircraft structure.

3. The computer-implemented method of claim 1, wherein the velocities of gusts and/or turbulences are calculated.

4. The computer-implemented method of claim 1, wherein the data and measurements substantial for describing the state of the aircraft include data from one or more of the group of: aircraft velocities, Euler angles, "body rates", accelerations, and/or GPS data.

5. The computer-implemented method of claim 1, wherein the data and measurements substantial for describing the state of the aircraft include control face data.

6. The computer-implemented method of claim 1, wherein the data and measurements substantial for describing the state of the aircraft include the engine thrust.

7. The computer-implemented method of claim 1, wherein the data substantial for describing the state of the aircraft include the air density $\rho$.

8. The computer-implemented method of claim 1, wherein the calculation of the gusts and/or structural loads is made during the flight and the results are recorded.

9. The computer-implemented method of claim 1, wherein the calculation of the gusts and/or structural loads is made after the flight on the basis of the recorded data.

10. The computer-implemented method of claim 8, wherein an inspection, maintenance and repair schedule is derived from the data obtained by the method depending on the occurrence of determined loads.

11. The computer-implemented method of claim 10, wherein inspection and/or maintenance intervals and/or repair times are derived from the data obtained by the method depending on the occurrence of determined loads.

12. The computer-implemented method of claim 1, wherein the observer is based on sets of nonlinear equations of motion (EQM) describing the movement of the rigid aircraft body and sets of linear equations of motion describing the elastic movement of the aircraft structure.

13. The computer-implemented method of claim 1, wherein the observer is based on a linear model.

14. The computer-implemented method of claim 1, wherein the aircraft model in the observer is based on a finite element model.

15. The computer-implemented method of claim 14, wherein in the finite element model, the degrees of freedom (DoF) are reduced by static condensation, wherein corresponding point masses are allocated to the grid points.

16. The computer-implemented method of claim 14, wherein in the finite element model the degrees of freedom concerning a movement of the elastic aircraft body are reduced to a predetermined number of modes concerning the movement of the elastic aircraft body.

17. The computer-implemented method of claim 16, wherein a number of first modes having the lowest frequencies are included in the model in order to calculate the loads at measuring stations between the grid points of the flexible structure with a predetermined accuracy.

18. The computer-implemented method of claim 1, wherein the nonlinear observer is designed in the form of a steady-state Kalman filter with disturbance processes acting on the input and the output quantities of the aircraft model.

19. The computer-implemented method of claim 18, wherein the minimization of the corresponding quadratic cost function is performed by a nonlinear parameter optimisation.

20. The computer-implemented method of claim 1, wherein the nonlinear model includes an aerodynamic sub-model used to calculate the aerodynamic forces $P_a^{aero}$.

21. The computer-implemented method of claim 20, wherein in the aerodynamic sub-model, the aerodynamic forces are calculated using aerodynamic strips.

22. The computer-implemented method of claim 20, wherein input quantities are supplied to the aerodynamic sub-model from the group of: control face positions $u_x$, true air speed $V_{tas}$, air density $\rho$, as well as gust velocities $v_{gust,l}$ and $v_{gust,r}$ on the left- or right-hand side of the aircraft.

23. The computer-implemented method of claim 22, wherein the gust velocities $v_{gust,l}$ and $v_{gust,r}$ are supplied to the aerodynamic sub-model as unknown disturbance quantities.

24. The computer-implemented method of claim 20, wherein the movement of the rigid aircraft body and the movement of the elastic aircraft body are furthermore supplied to the aerodynamic sub-model as input quantities.

25. The computer-implemented method of claim 20, wherein the aerodynamic forces $P_a^{aero}$ are calculated by steady-state aerodynamics.

26. The computer-implemented method of claim 20, wherein the aerodynamic forces $P_a^{aero}$ are superposed and calculated as non-steady-state forces.

27. The computer-implemented method of claim 26, wherein the non-steady-state forces are calculated by Wagner and Küssner functions.

28. The computer-implemented method of claim 25, wherein the effects of downwash and sidewash are additionally taken into account in the aerodynamic model.

29. The computer-implemented method of claim 20, wherein the nonlinear model includes a propulsion forces sub-model used to calculated the propulsion forces $P_a^{prop}$.

30. The computer-implemented method of claim 29, wherein the propulsion forces $P_a^{prop}$ are calculated with the boundary that the engine forces are compensated with the resistance forces on the aircraft for the angle of attack valid for a steady-state 1g-level flight at constant propulsion force.

31. The computer-implemented method of claim 20, wherein the nonlinear model includes a signal evaluation sub-system for supplying the aircraft measured values $y_m$ required for the model.

32. The computer-implemented method of claim 20, wherein the nonlinear model includes a structural load sub-system of the internal loads $P_c^{int}$ at the measuring stations of the aircraft structure.

33. The computer-implemented method of claim 32, wherein the internal loads $P_c^{int}$ are calculated by a force summation method.

34. The computer-implemented method of claim 14, wherein the nonlinear model is implemented in state space using a first-order nonlinear differential equation $$\dot{x}_p = f_p(x_p, u_{pc}, u_{pd}) \tag{1}$$

and the initial state vector $x_p$ $(t=0)=x_{p0}$.

35. The computer-implemented method of claim 34, wherein the state vector $x_p$ (index p)

$$\underline{x}_p = \begin{bmatrix} x_{p,rigid} \\ x_{p,elastic} \end{bmatrix}. \tag{2}$$

is divided into a sub-state vector $x_{p,\,rigid}$ for the movement of the rigid body and a vector $x_{p,\,elastic}$ with the states describing the elastic movement of the aircraft.

36. The computer-implemented method of claim 34, wherein the commands of the control faces are combined in a control input vector (index c) $u_{pc}$ $$\underline{u}_{pc} = \underline{u}_x = \begin{bmatrix} u_{x,1} \\ u_{x,2} \\ \vdots \\ u_{x,20} \end{bmatrix}. \tag{3}$$

wherein $u_{x,1}$, $u_{x,2}$ ... $u_{x,n}$ are the adjustments of rudder, elevators, ailerons, spoilers and stabilisers.

37. The computer-implemented method of claim 34, wherein the gust velocities on the left- and on the right-hand side are combined as unknown disturbance input quantities in a disturbance input vector $u_{pd}$ (index d)

$$\underline{u}_{pd} = \begin{bmatrix} \underline{V}_{gust,l} \\ \underline{V}_{gust,r} \end{bmatrix} = \begin{bmatrix} u_{gust,l} \\ v_{gust,l} \\ w_{gust,l} \\ u_{gust,r} \\ v_{gust,r} \\ w_{gust,r} \end{bmatrix}. \tag{4}$$

wherein $u_{gust}$, $v_{gust}$, $w_{gust}$ describe the corresponding longitudinal, lateral or vertical velocity components in the coordinate system of the aircraft.

38. The computer-implemented method of claim 34, wherein the gust velocities on the left- and on the right-hand side combined as disturbance input quantities in the disturbance input vector $u_{pd}$ (index d) contain further velocity components $$\underline{u}_{pd} = \begin{bmatrix} v_{gust,front} \\ v_{gust,fin} \\ w_{gust,wing,l} \\ w_{gust,wing,r} \end{bmatrix}. \tag{4a}$$

wherein $v_{gust,front}$, $v_{gust,fin}$, $w_{gust,wing,\,l}$, $w_{gust,wing,r}$ describe the corresponding frontal or lateral velocity components in the coordinate system of the aircraft.

39. The computer-implemented method of claim 34, wherein standard measure values available in the aircraft for the Euler angles ($\Phi$, $\Theta$, $\Psi$) and "body rates" ($p_B$, $q_B$, $r_B$) in the coordinate system of the aircraft as well as the lateral and vertical velocities ($\dot{y}_E$, $\dot{z}_E$) of the centre of gravity in the ambient coordinate system and the lateral and vertical accelerations ($\ddot{y}_B$, $\ddot{z}_B$) of the aircraft body close to the centre of gravity in the coordinate system of the aircraft are modelled as the measurement output equation $$\underline{y}_{pm} = \begin{bmatrix} \Phi \\ \Theta \\ \Psi \\ p_B \\ q_B \\ r_B \\ \dot{y}_E \\ \dot{z}_E \\ \ddot{y}_B \\ \ddot{z}_B \end{bmatrix} = \underline{g}_{pm}(\underline{x}_p, \underline{u}_{pc}, \underline{u}_{pd}). \tag{5}$$

40. The computer-implemented method of claim 34, wherein the internal loads $P_c^{int}$ to be reconstructed and the gust velocities to be determined are added to the model from output quantities by the target output equation $y_{po}$ (index o)

$$y_{po} = \begin{bmatrix} p_c^{int} \\ V_{gust,l} \\ V_{gust,r} \end{bmatrix} = g_{po}(x_p, u_{pc}, u_{pd}). \quad (6)$$

41. The computer-implemented method of claim 33, wherein the unknown gust velocities are modelled using a disturbance model $$\dot{x}_d = f_d(x_d, u_d, v_d), \; x_d(t=0) = 0 \quad (7)$$
$$y_d = g_d(x_d).$$

42. The computer-implemented method of claim 34, wherein substitution of the output quantity of the disturbance model $u_{pd} = y_d$ in the first-order nonlinear differential equation in state space obtains an extended nonlinear distance model $$\begin{bmatrix} x_p \\ x_d \end{bmatrix}^\circ = \begin{bmatrix} f_p(x_p, u_{pc}, g_d(x_d), v_{pc}) \\ f_d(x_d, u_d, v_d) \end{bmatrix} \quad (8)$$
$$\dot{x}_a = f_a(x_a, u_{pc}, u_d, v)$$

wherein the state vector $x_a$ contains the states $x_p$ of the aircraft and the states $x_d$ of the disturbance model.

43. The computer-implemented method of claim 34, wherein, by adding the measurement noise in the vector w and substituting the disturbance input, the measurement output equation $y_{pm}$ (5) of the nonlinear model generates a measurement output equation $$y_{pm} = g_{pm}(x_p, u_{pc}, g_d(x_d)) + w \quad (9)$$
$$= g_{am}(x_a, u_{pc}) + w.$$

for the extended distance model.

44. The computer-implemented method of claim 43, wherein by substituting the disturbance input in the target output equation $y_{po}$ (6), the target output equation of the extended distance model $$y_{po} = g_{po}(x_p, u_{pc}, g_d(x_d)) \quad (10)$$
$$= g_{ao}(x_a, u_{pc}).$$

is generated to calculate the structural loads and gust velocities from the states of the extended model and the control input quantities.

45. The computer-implemented method of claim 34, wherein the differences between the actual measurements in the measurement output vector $y_{pm}$ and the measured values $\hat{y}_{pm}$ calculated by the extended distance model are fed back to the derivative of the state vector of the observer by an observer amplification matrix L and the elements of the observer amplification matrix L are produced by a design similar to a Kalman filter design by adding the noise processes to the extended distance model.

46. The computer-implemented method of claim 45, wherein the elements of the observer amplification L are produced by numerical minimisation of the cost function J in relation to the elements of the observer amplification matrix L.

47. The computer-implemented method of claim 45, wherein the observer amplification matrix L is divided into sub-matrices $L_p$ for the distance states and $L_d$ for the disturbance model states and the sub-matrix $L_p$ for the distance states is further divided into feedback amplification matrices $L_{p,rigid}$ for the states of the rigid body model and $L_{p,elastic}$ for the states of the elastic aircraft structure.

48. The computer-implemented method of claim 46, wherein only a few selected elements of the observer amplification elements in relation to stability and response speed are used and all other elements are set to zero.

* * * * *

UNITED STATES PATENT AND TRADEMARK OFFICE
CERTIFICATE OF CORRECTION

PATENT NO. : 8,209,159 B2
APPLICATION NO. : 12/085891
DATED : June 26, 2012
INVENTOR(S) : Lars Bensch et al.

It is certified that error appears in the above-identified patent and that said Letters Patent is hereby corrected as shown below:

On the Title Page of the patent item (74) replace "Krumholtz" with --Krumholz--.

In the Specification

Column 5, Line 25 "(" before the word describe should be deleted.

Signed and Sealed this
Twenty-third Day of September, 2014

Michelle K. Lee
*Deputy Director of the United States Patent and Trademark Office*